Nov. 20, 1956  W. KASTEN ET AL  2,771,156
FILTER
Filed Oct. 22, 1953

INVENTOR.
WALTER KASTEN
ABBOTT M. ROHN
BY
Robert C. Smith
ATTORNEY

United States Patent Office 2,771,156
Patented Nov. 20, 1956

2,771,156
FILTER

Walter Kasten and Abbott M. Rohn, Detroit, Mich., assignors to Bendix Aviation Corporation, South Bend, Ind., a corporation of Delaware Application October 22, 1953, Serial No. 387,734

3 Claims. (Cl. 183—71)

This invention relates to filters, and more particularly, to an improved type of replaceable filter element and the method for making the element.

The conventional replaceable filter element may take any of a number of forms of which one of the more common is the pleated paper type. In producing this type of element, a length of filter paper is usually treated with a resinous impregnating substance, such as a phenolic condensation product, folded into pleats of the desired dimension, formed into cylindrical shape, and heated to a temperature and for a time sufficient to polymerize the resinous substance. A final step is the bonding of end plates to each end of the pleated member. When the element is placed in the filter housing, it is usually necessary that a gasket be provided to insure a seal between the inlet and outlet passages, so that unfiltered material will not by-pass the filter element. Thus several processes are necessary: forming the cylindrical member, making the endcaps, attaching the endcaps, and finally making and installing a gasket in the housing. The elimination of any of these processes is, of course, highly desirable.

One of the results of the search for cheaper and better replaceable elements was the molded plastic endcap or endplate which was formed and attached to the end of the filter pleats in one operation by the use of a smooth flat mold. This structure, however, presented difficulties in that it did not form a smooth flat surface on the face of the end cap, one reason being that it was almost impossible to prevent the trapping of air which produces pinholes or blisters. In addition, the weight of the element assembly itself was sufficient to squeeze the liquid plastic out from under it, thus causing irregularities in the surface. The applicants have determined that when a grooved mold having ridges therein is used, the tendency to trap air is greatly minimized because the contacting area of the ends of the pleated paper with the bed of the mold is far less. The plastic material, instead of being forced to expand vertically as was the case when using a smooth flat mold, now must first fill the grooves formed by the ridges in the mold, thus allowing very little material for vertical expansion. As a result of the ridges in the mold the endcap is formed so that the pleated ends are embedded a predetermined depth from the outer faces of the endcap thereby insuring a proper endcap seal and an endcap free of imperfections. The ridges also form smooth, even grooves on the outer face which seal tightly against a flat surface as in a filter housing. In the present grooved molded endcap the pleats are bonded to the endcaps and the endcap is formed in one operation, the molded endcap serving as a gasket. This last feature, of course, also simplifies installation of the element in the filter housing.

Accordingly, it is an object of the present invention to produce a filter element which will form a tight seal against the filter housing.

Another object of the present invention is to provide a method of producing filter elements in which the endcap is formed and permanently attached in one operation.

Another object is to provide an endcap for a filter element which also serves as a seal between the pleated ends of the element and filter housing or the like.

Another object is to produce an element which is highly resistant to damage from jarring or dropping.

Other objects and advantages will become apparent from the following description and accompanying drawings, wherein.

Figure 1:
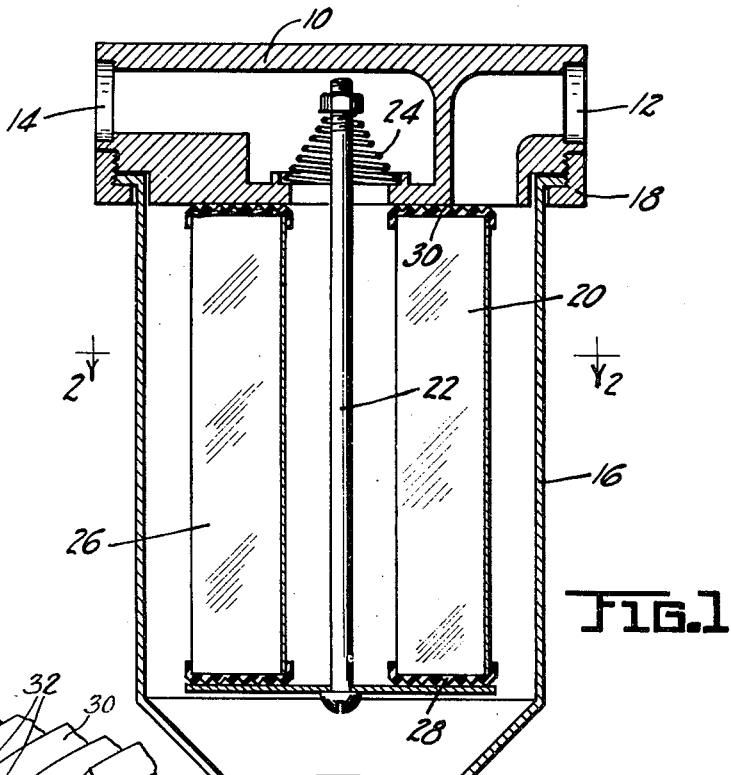
Figure 1 is a sectional view of the filter element placed in a standard type of filter housing.
Figure 4:
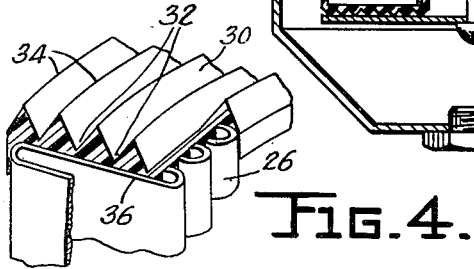
Figure 4 is an enlarged section view in perspective of a portion of the filter element take on line 4—4 of Figure 3 with portions of the endcap broken away for clarity.
Figure 2:
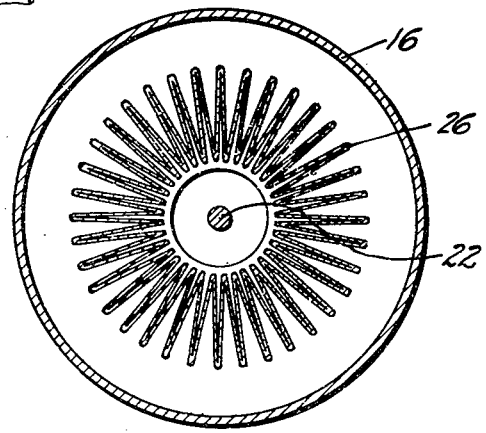
Figure 2 is a sectional view of the filter taken on line 2—2 of Figure 1.
Figure 3:
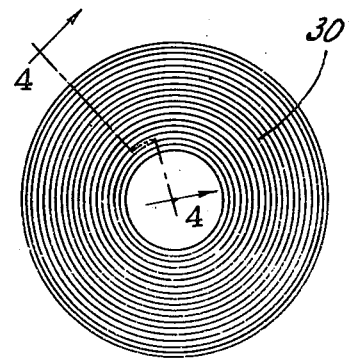
Figure 3 is an end view of the filter element.

Referring to Figure 1, the filter consists of a head member 10, containing inlet passage 12, outlet passage 14, and a bowl 16 which is fastened to the head 10 by means of an annular threaded member 18. A filter element 20 is held tightly against head 10 by means of bolt 22 and spring 24. Element 20 consists of a cylindrical pleated paper filter element 26 embedded in endcaps 28 and 30. Endcaps 28 and 30 have grooves 32 molded therein, the adjacent grooves forming ridges 34.

In operation the fluid to be filtered enters inlet port 12 and flows into bowl 16 where it surrounds the filter element 20. It then passes through the pores of the pleated element and goes out the top of said element and out of passage 14. It is, of course, quite important that a good seal be made between endcap 30 and head 10, to prevent by-passing of unfiltered fluid past the element.

In the process of molding the endcaps, the ends 36 of the pleated element are immersed in a mold filled with plastic composition and cured for from five to ten minutes at 350–375° F. When ejected from the mold the ends 36 of the pleats will be covered with a tough rubber-like product called a "Plastisol." Plastisols, as known in the art, consist of (1) a vinyl resin, (2) fillers and/or pigments, (3) one or more plasticizers, and (4) stabilizers. Upon the application of heat, the liquid fuses together to form a homogeneous, uniform mass, free of volatile matter. The bottom of the mold has ridges formed thereon so that the plastisol endcaps 28 and 30 will be formed with grooved outer faces.

When properly molded with circular ridges according to this method, the ends of the pleats are all sealed. This is because the ridges in the mold separate the bottom of the mold from the pleated ends 36 of the element and allow these ends to be covered with a continuous uninterrupted film of plastic. This is not the case when the bottom of the mold is flat. The ridges or grooves in the bottom of the mold thus serve a dual purpose. Firstly, they permit the forming of an improved seal on the end of the filter pleats and secondly, they form ridges or grooves on the face of the endcaps which provide a better seal between the filter housing and the end of the filter pleats than could be obtained with endcaps formed with a smooth flat mold.

Although only one type of element is shown utilizing this grooved and molded endcap, it will be apparent to those skilled in the art that many modifications are possible. If desired, the element may be formed with a core. The molded endcap may be placed on other than pleated elements. Of course, the element may be of many sizes and shapes. Therefore, it should be understood that the invention is not to be limited to the particular modifications herein disclosed.

We claim:

1. A filtering device comprising a pleated filter element, resilient plastic endcaps closing the ends of said pleated element by having the ends of said filter pleats embedded therein, and a groove formed in the outer face of each of said endcaps, said groove having two side walls, said walls extending substantially the same distance from the bottom of the groove to a common plane.

2. A filtering device comprising a pleated filter element, resilient plastic endcaps closing the ends of said pleated element by having the ends of said filter plates embedded therein, and a plurality of grooves formed in the outer face of each of said endcaps, said grooves each having two side walls, said side walls extending substantially the same distance from the bottom of the groove to a common plane.

3. A filtering device comprising a pleated filter element, a plastic endcap closing an end of said pleated element by having the ends of said filter pleats embedded therein, and a groove formed in the outer face of said endcap, said groove having two side walls, said walls extending substantially the same distance from the bottom of the groove to a common plane.

References Cited in the file of this patent

UNITED STATES PATENTS

| | | |
|---|---|---|
| 2,317,110 | Person | Apr. 20, 1943 |
| 2,443,430 | Nigro | June 15, 1948 |
| 2,463,722 | Spraragen | Mar. 8, 1949 |
| 2,537,992 | Gross et al. | Jan. 16, 1951 |
| 2,732,031 | Rabbitt et al. | Jan. 24, 1956 |

FOREIGN PATENTS

| | | |
|---|---|---|
| 596,138 | Germany | of 1934 |
| 680,211 | Great Britain | of 1952 |